(12) United States Patent
Lin et al.

(10) Patent No.: US 11,351,541 B2
(45) Date of Patent: Jun. 7, 2022

(54) IN-SITU FLUIDIC INSPECTION

(71) Applicant: ILLUMINA, INC., San Diego, CA (US)

(72) Inventors: Sz-Chin Steven Lin, Ladera Ranch, CA (US); Richard Lemoine, San Diego, CA (US); Rajagopal Panchapakesan, Escondido, CA (US); Wesley A. Cox-Muranami, San Diego, CA (US); Darren Segale, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 309 days.

(21) Appl. No.: 16/500,787

(22) PCT Filed: Apr. 2, 2018

(86) PCT No.: PCT/US2018/025686
§ 371 (c)(1),
(2) Date: Oct. 3, 2019

(87) PCT Pub. No.: WO2018/187207
PCT Pub. Date: Oct. 11, 2018

(65) Prior Publication Data
US 2021/0299661 A1 Sep. 30, 2021

Related U.S. Application Data

(60) Provisional application No. 62/482,414, filed on Apr. 6, 2017.

(51) Int. Cl.
*B01L 3/00* (2006.01)
*F16K 99/00* (2006.01)
(Continued)

(52) U.S. Cl.
CPC .... *B01L 3/502738* (2013.01); *F16K 99/0013* (2013.01); *F16K 99/0028* (2013.01);
(Continued)

(58) Field of Classification Search
CPC combination set(s) only.
See application file for complete search history.

(56) References Cited

U.S. PATENT DOCUMENTS 9,440,233 B2 9/2016 Dothie et al.
2003/0012712 A1* 1/2003 Norris ............... H01L 21/67023
422/236
(Continued)

FOREIGN PATENT DOCUMENTS

CN 102036750 4/2011
CN 102671725 9/2012
(Continued)

*Primary Examiner* — Samuel P Siefke
*Assistant Examiner* — Tingchen Shi
(74) *Attorney, Agent, or Firm* — Illumina, Inc.

(57) ABSTRACT

A method includes engaging a well of a cartridge with a flow sensor of an instrument. The cartridge includes: a rotary valve including a rotatable port and a center port; the well in fluid communication with a channel, the channel including a channel port that the rotatable port is to align to in order to receive fluid from the well; and a flowcell including an inlet gasket in fluid communication with the center port. A source of pressurized air is connected to the flow sensor in order to establish a mass flow of air through a flow path. The flow path extends through one of the flow sensor, the channel, the rotary valve, and the flowcell. The mass flow of air through the flow path is measured with the flow sensor. It is determined if there is one of an air leak and an air blockage within the flow path.

10 Claims, 14 Drawing Sheets

(51) Int. Cl.
*G01M 3/28* (2006.01)
*G01M 3/26* (2006.01)

(52) U.S. Cl.
CPC .......... *G01M 3/26* (2013.01); *G01M 3/2876* (2013.01); *B01L 2400/0644* (2013.01); *F16K 2099/0084* (2013.01)

(56) References Cited

U.S. PATENT DOCUMENTS

| | | |
|---|---|---|
| 2003/0077495 A1 | 4/2003 | Scartozzi et al. |
| 2004/0179972 A1 | 9/2004 | Karp et al. |
| 2009/0099782 A1 | 4/2009 | Kim et al. |
| 2010/0111768 A1 | 5/2010 | Banerjee et al. |
| 2011/0070654 A1 | 3/2011 | Tokhtuev et al. |
| 2011/0137596 A1 | 6/2011 | Grattoni et al. |
| 2013/0000388 A1 | 1/2013 | Allegato et al. |
| 2014/0069214 A1 | 3/2014 | Kruckow et al. |
| 2014/0276421 A1 | 9/2014 | Plahey et al. |
| 2016/0061349 A1 | 3/2016 | Shields et al. |
| 2016/0231155 A1 * | 8/2016 | Sasaki ............... G01R 3/00 |
| 2016/0263578 A1 | 9/2016 | Schultz |

FOREIGN PATENT DOCUMENTS

| | | | |
|---|---|---|---|
| CN | 103105273 | 5/2013 | |
| CN | 104696706 | 6/2015 | |
| CN | 205333264 U | 6/2016 | |
| CN | 205826252 U | 12/2016 | |
| CN | 106536055 | 3/2017 | |
| DE | 102014221499 | 4/2016 | |
| DE | 102014221499 A1 * | 4/2016 | .......... B01J 19/0093 |
| WO | 2005/085855 | 9/2005 | |
| WO | 2015/187868 | 12/2015 | |
| WO | WO-2015187868 A2 * | 12/2015 | .......... F16K 99/0028 |
| WO | 2016/004171 | 1/2016 | |
| WO | 2017/037072 | 3/2017 | |

* cited by examiner

FIG. 4

Inspection Procedure Flow Chart 200

| 211 Step | 212 Instrument and Flowcell to Cartridge Interface | 213 Rotary Valve | 214 1st Pinch Valve 1 | 215 2nd Pinch Valve 2 | 216 Result if Test Passed | 217 Purpose of Test | 218 Actions on Failed Test |
|---|---|---|---|---|---|---|---|
| 221 0 | 222 Disengaged | 223 NA | 224 NA | 225 NA | 226 Flow at or above 1st open threshold | Verify performance of the flow sensor in an open state. 227 | Re-initialize instrument. If failed again flag Instrument hardware failure. 228 |
| 231 1 | 232 Engaged | 233 Blocked | 234 Open | 235 Open | 236 Flow at or below 1st blocked threshold | Confirm blocked flow through rotary valve 237 | Re-home the rotary valve; re-test. 238 |
| 241 2 | 242 Engaged | 243 Aligned | 244 Open | 245 Open | 246 Flow at or above 2nd open threshold | Confirm flow at rotary valve aligned location. Determine fluidic center position (home position) of rotary valve. Detect unwanted leakage paths. 247 | Re-home, return to step 1. During this step, the rotary valve can also be swept through the open well channel port to re-calibrate the fluidic center. 248 |
| 251 3 | 252 Engaged | 253 Aligned | 254 Closed | 255 Open | 256 Flow at or below 2nd blocked threshold | Detect flowcell seal and 1st pinch valve seal. Detect any leakage beween 1st pinch valve and flowcell. 257 | Instrument automatically re-docks the flowcell or ejects the cartridge for the user to clean the gasket and reinsert the flowcell. Re-test from step 1. Reject if failed re-test. Potential 1st pinch valve failure. 258 |
| 261 4 | 262 Engaged | 263 Aligned | 264 Open | 265 Closed | 266 Flow at or below 3rd blocked threshold | Detect cartridge syringe pump seal and 2nd pinch valve seal. Detect possible leakage between plunger and cylinder bore of syringe pump. 267 | Exercise syringe pump, re-test, reject if failed during re-test. Potential 2nd pinch valve or syringe pump failure. 268 |

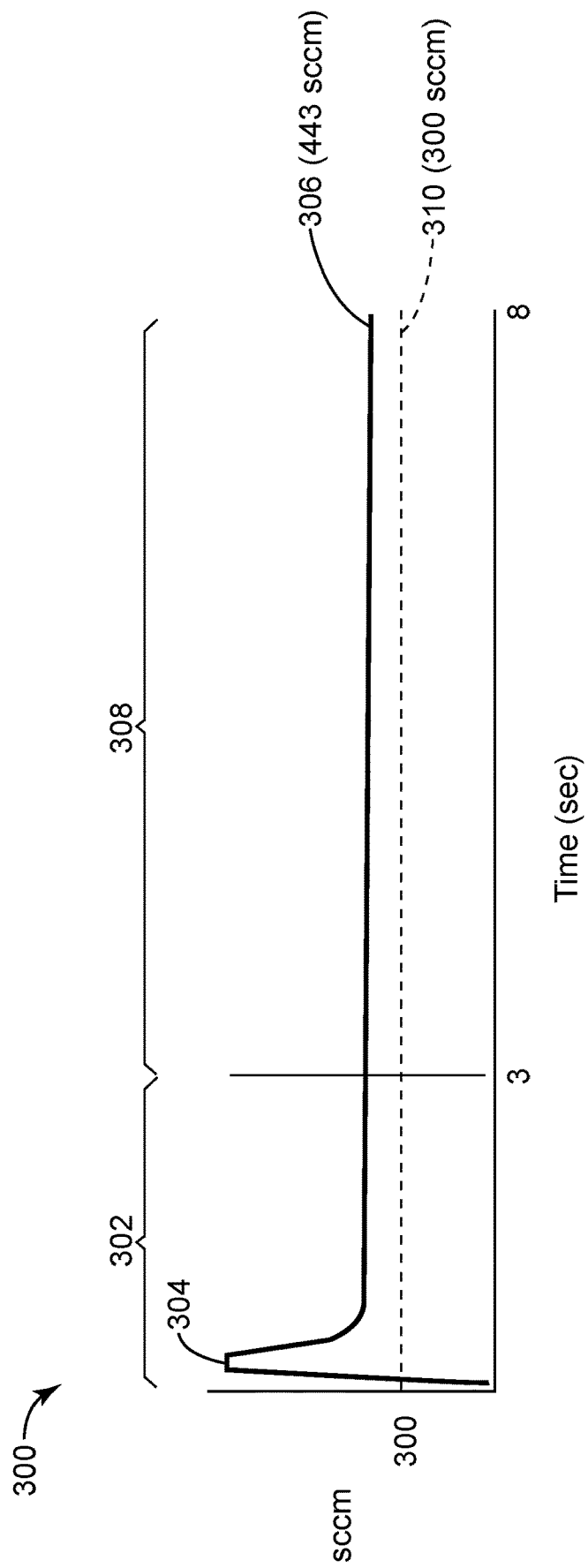

Step 1

Step 2

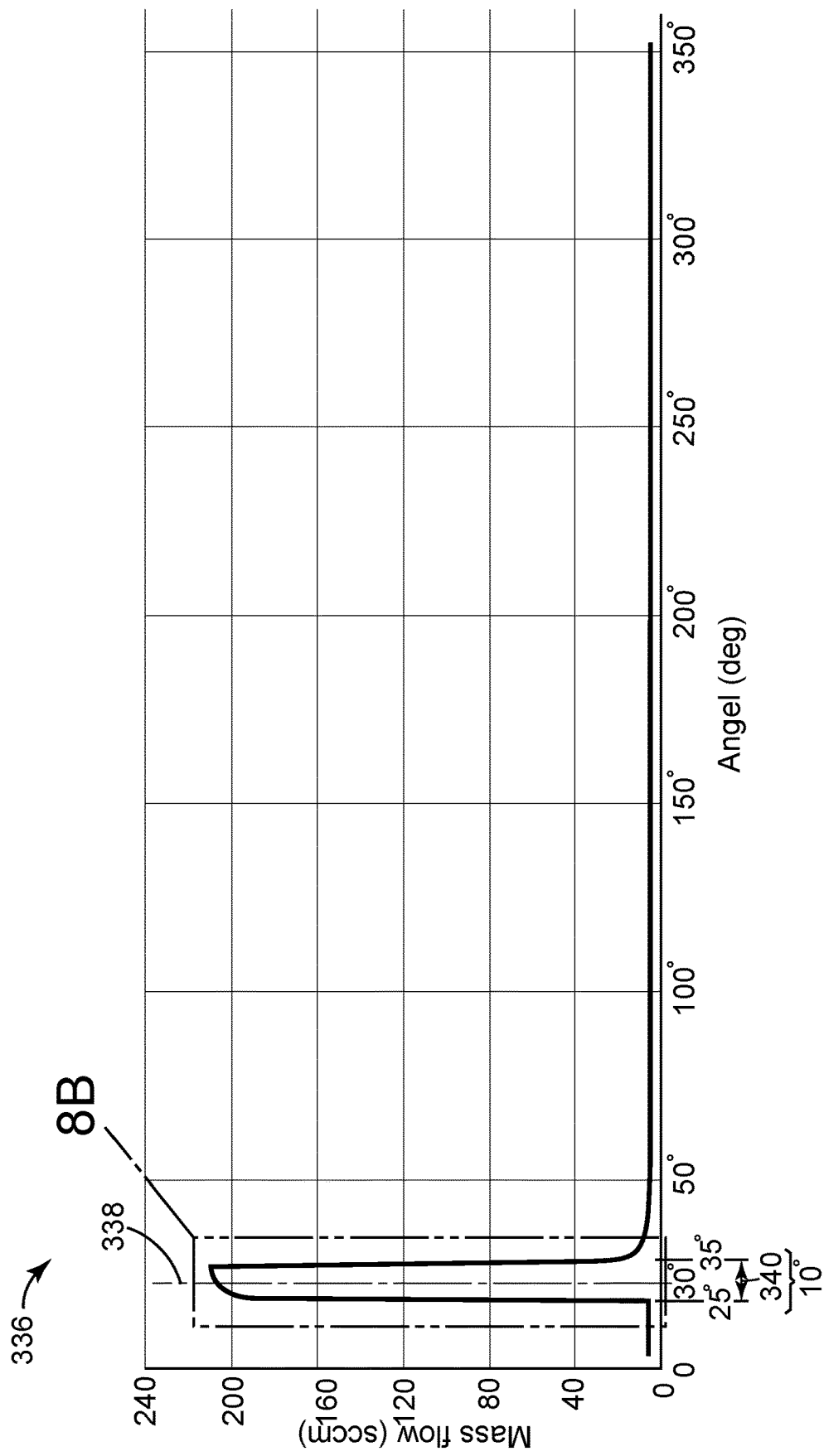

Step 2

Step 2

IN-SITU FLUIDIC INSPECTION

CROSS-REFERENCE TO RELATED APPLICATIONS

This application is a 35 U.S.C. § 371 National Stage application of International Patent Application No. PCT/US2018/025686, filed Apr. 2, 2018, which claims priority to U.S. Provisional Application No. 62/482,414, filed Apr. 6, 2017. The entire contents of each of the aforementioned applications are hereby incorporated herein by reference.

BACKGROUND

Microfluidics is a growing field in which low volume, often sub-millimeter scale, fluids are processed, controlled and/or measured to perform a variety of engineering and scientific tasks. Such tasks may include multiplexing for the telecommunications and computer industries, high-throughput sequencing for the health and pharmaceutical industries and more.

Many microfluidic devices, such as cartridges for gene sequencing, may include an internal rotary selector valve and multiple internal fluidic channels in fluid communication with reagent wells. The rotary valve should align with each channel in order to select any one of a plurality of reagents which can flow through a reagent flow path that extends from the wells, through the channels and through the rotary valve.

Some cartridges include a fluidic device, such as a flowcell, that includes an inlet gasket and an outlet gasket connected therebetween by a flowcell channel. The flowcell channel may include a sample, such as sample of DNA. The flowcell inlet gasket may be engaged and disengaged with the rotary valve to extend the reagent flow path through the flowcell in order to perform various controlled reactions on the sample with a predetermined sequence of the reagents. The reagents and/or byproducts of the reactions may then pass, via the flow path, through other components of the cartridge (such as an internal pump and pinch valves) and into a vented waste tank.

Such cartridges may be engaged in a system, such as an instrument, that is used to operate the cartridge during its normal operation. For example, the instrument can include various sub-systems for controlling operation of the rotary valve and other components on the cartridge, metering and timing reagent flows to the sample, measuring results of the reactions, processing data, interfacing with a user and more.

Functionality of the cartridge depends on establishing reliable seals between the flowcell, the various other components of the cartridge and the instrument. Improper seals between the flowcell, cartridge and instrument may lead to failed runs. Additionally, such defective seals could cause liquid leakage into the instrument, which could damage the instrument's electronics.

Moreover, improper seals between a cartridge onboard pump (such as a syringe pump) and its associated pinch valves can also affect the functionality of the cartridge. For example, an improper pinch valve and/or pump seal may lead to an unwanted no flow condition or a flow in an incorrect direction.

Additionally, functionality of the cartridge depends on accurate movement of the internal rotary valve to the channel ports of the channels that the reagents from the wells flow through. Such accurate movement depends, in part, on establishing an accurate home position from which the rotary valve rotates.

The cartridges and instruments are subjected to quality testing procedures during manufacture. However, on-site usage, storage and shipping conditions and/or unforeseen events can lead to potential wear or damage of such seals in the field.

Accordingly, there is a need for a method of performing in-situ inspection of the fluidic seals between the instrument, flowcell and cartridge. More specifically, the method should test the integrity of the seals between the instrument and the various components within the cartridge, such as the rotary valve, the flowcell, the pinch valves and the syringe pump.

Additionally, there is a need for an in-situ method that can accurately establish a home position for the rotary valve. The home position may be a position of maximum flow (or fluidic center of alignment) between the rotary valve and a well channel to which the rotary valve is aligned.

BRIEF DESCRIPTION

The present disclosure provides an in-situ inspection method, which can perform inspection of the fluidic seals between the instrument, flowcell and cartridge (i.e. the system). More specifically, the method can test the integrity of the seals between the instrument and the various components within the cartridge, such as the rotary valve, the flowcell, the pinch valves and the syringe pump.

Additionally, the in-situ method can accurately (for example, within +/−1 degree of rotation) establish a home position for the rotary valve. More specifically, the method can accurately establish a fluidic center of alignment between the rotary valve and at least one channel that the rotary valve aligns with, wherein the alignment is, for example, within +/−1 degree.

Moreover, the in-situ method may correct for hysteresis or backlash in the system. Such hysteresis may occur when the instrument drives the rotary valve in one direction, for example clockwise, and then the opposite direction, for example counter-clockwise. In case of backlash or hysteresis, this method can be used to accurately determine the drive distance needed in each direction to reach the fluidic center of alignment. In this way, this method can be used to remove the effect of backlash caused by, for example, an imprecise coupling between cartridge rotor and shaft or between the instrument drive and the cartridge.

A method in accordance with one or more aspects of the present disclosure includes engaging a well of a cartridge with a flow sensor of an instrument. The cartridge includes:
i) a rotary valve including a rotatable port and a center port,
ii) the well in fluid communication with a channel, the channel including a channel port that the rotatable port is to align to in order to receive fluid from the well, and
iii) a flowcell including an inlet gasket in fluid communication with the center port.

A source of pressurized air is connected to the flow sensor in order to establish a mass flow of air through a flow path. The flow path extends through one of the flow sensor, the channel, the rotary valve, and the flowcell. The mass flow of air through the flow path is measured with the flow sensor. It is determined if there is one of an air leak and an air blockage within the flow path.

Another method in accordance with one or more aspects of the present disclosure includes engaging a well of a cartridge with a flow sensor of an instrument for operating the cartridge. The cartridge includes:
i) a rotary valve including a rotatable port and a center port, ii) the well in fluid communication with a channel, the channel including a channel port that the rotatable port is to align to in order to receive fluid from the well, iii) a first (1$^{st}$) pinch valve including a 1$^{st}$ inlet and a 1$^{st}$ outlet, iv) a second (2$^{nd}$) pinch valve including a 2$^{nd}$ inlet and a 2$^{nd}$ outlet, v) a syringe pump in fluid communication with the 1$^{st}$ outlet and 2$^{nd}$ inlet, and vi) a flowcell including an inlet gasket and an outlet gasket, the flowcell operable to engage and disengage the inlet gasket with the center port and the outlet gasket with the 1$^{st}$ inlet.

The flowcell inlet gasket is engaged with the center port of the rotary valve and the flowcell outlet gasket is engaged with the 1$^{st}$ inlet of the 1$^{st}$ pinch valve. A source of pressurized air is connected to the flow sensor in order to establish a mass flow of air through a flow path. The flow path extends through one of the flow sensor, the channel, the rotary valve, the flowcell, the 1$^{st}$ and 2$^{nd}$ pinch valves and the syringe pump. The mass flow of air through the flow path is measured with the flow sensor. It is determined if there is one of an air leak and an air blockage within the flow path.

DRAWINGS

The disclosure will be more fully understood from the following detailed description taken in conjunction with the accompanying drawings, in which:

FIG. 4 is an inspection procedure flow chart of a method of in-situ testing of fluidic seals between the instrument, cartridge and flowcell having method steps 0, 1, 2, 3 and 4 in accordance with one example described herein;

FIG. 5 is a graph of the measured mass flow of air through a flow path during step 0 of the in-situ testing method of FIG. 4 in accordance with one example described herein;

FIG. 8A is a graph of a fluidic center position of a well channel port relative to an aligned rotatable port of the rotary valve of FIG. 1B in accordance with one example described herein;

Figure 11:
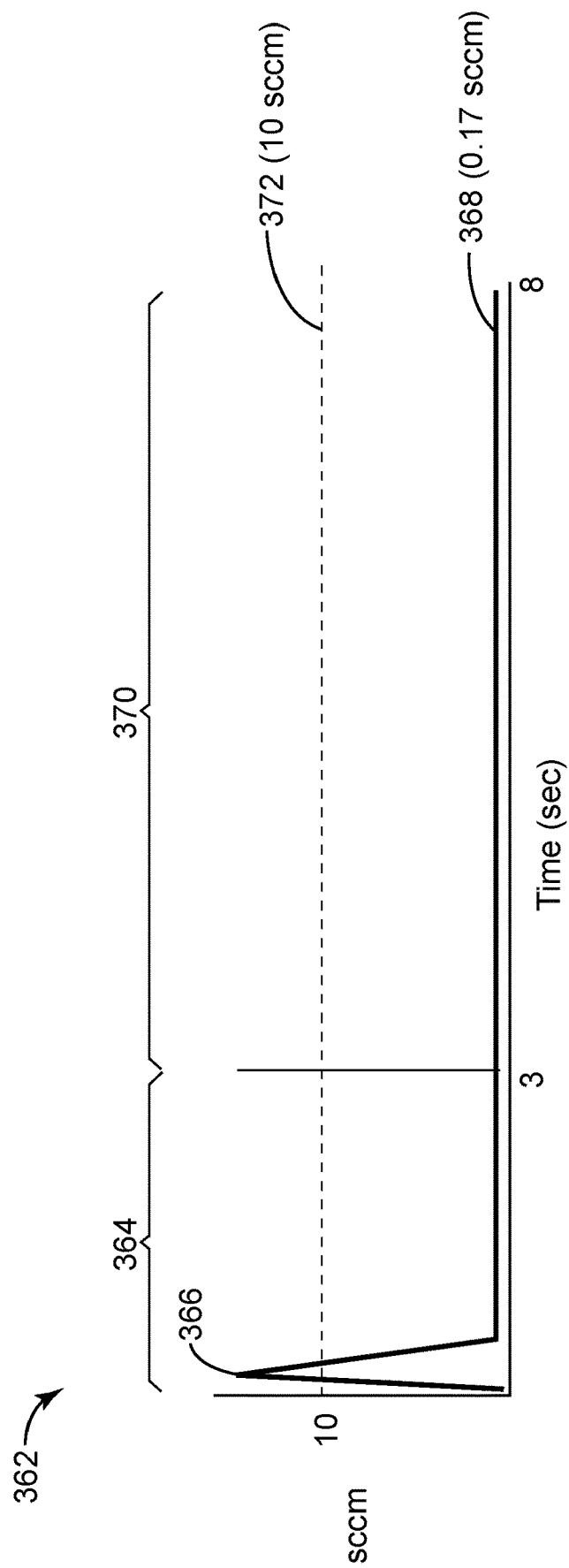
Figure 12:
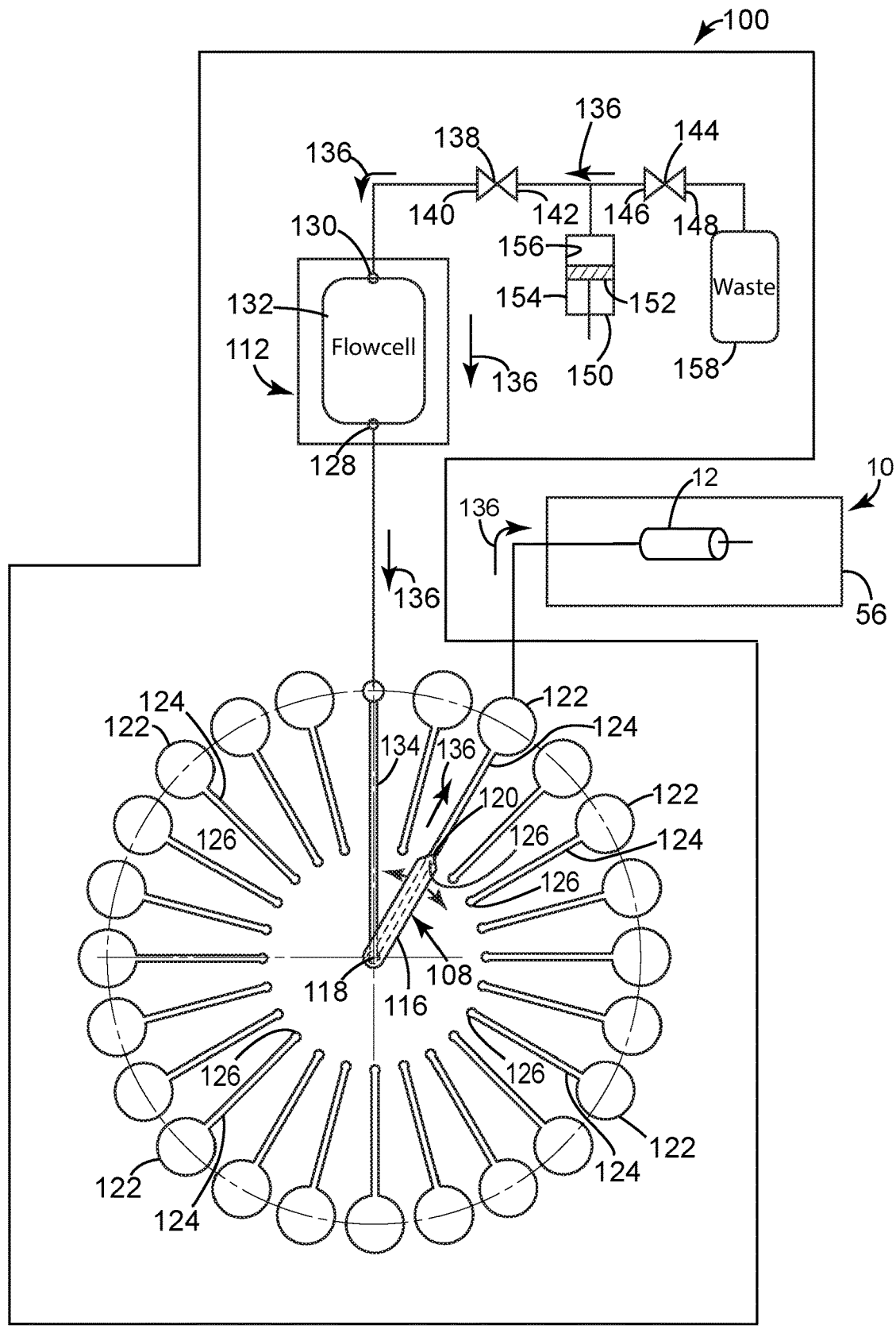

FIG. 11 is a graph of the measured mass flow of air through the flow path during step 4 of the in-situ testing method of FIG. 4 in accordance with one example described herein; and FIG. 12 is an alternative example of a schematic of a fluidic layout of a microfluidic cartridge engaged in fluid communication with an instrument for operating the cartridge in accordance with one example described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

FIGS. 1A-12 illustrate various examples of an in-situ method of testing a fluidic cartridge 100 in accordance with an example of the present disclosure.

Figure 1A:
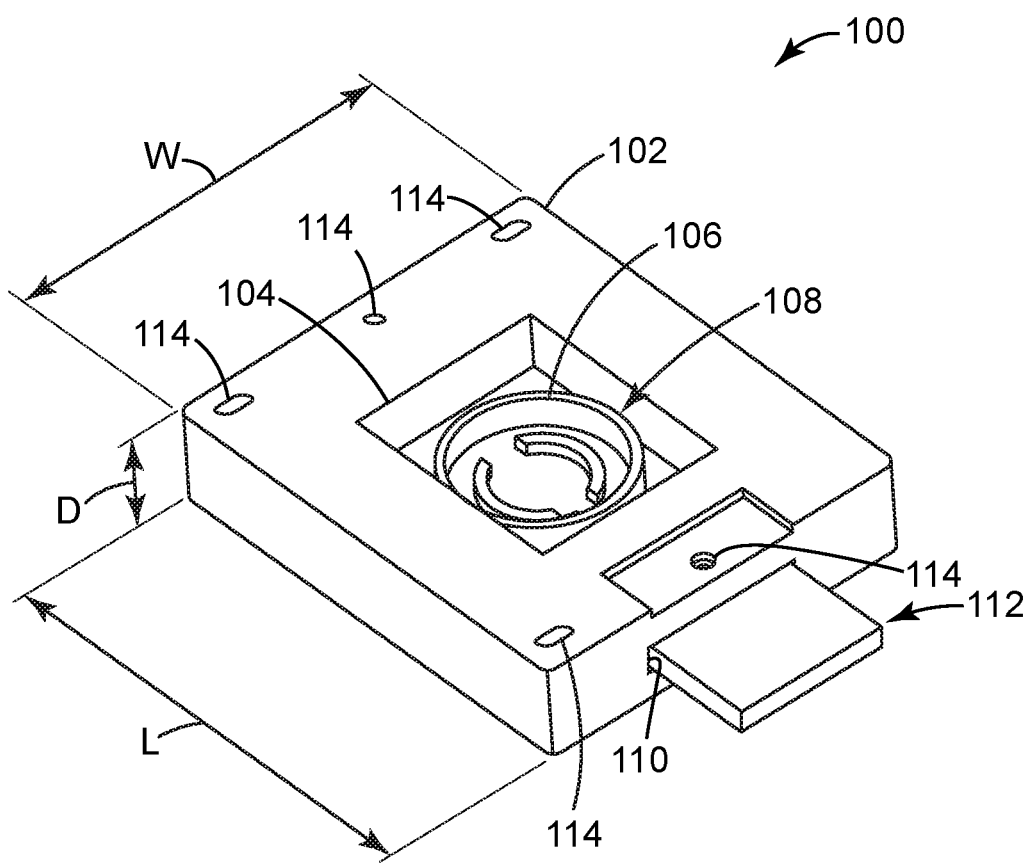
FIG. 1A is a simplified perspective view of a microfluidic cartridge have a rotary valve and a flowcell in accordance with one example described herein.

Referring to FIG. 1A, an example of a perspective view of a microfluidic device 100 is illustrated. While examples herein are described in connection with such systems as microfluidic cartridges, flowcells and instruments, optionally examples may be implemented with fluidic systems that may not otherwise be considered "micro" fluidic systems.

The microfluidic cartridge 100 has a boxlike outer enclosure 102. The enclosure 102 has a length L of approximately 6 inches, a width W of approximately 4 inches and a depth D of approximately 2 inches. The enclosure 102 includes a recessed section 104 disposed centrally within the enclosure 102. The recessed section 104 is sized to allow a rotatable outer keyed portion 106 of a rotary valve 108 to protrude through. The keyed portion 106 may be mechanically coupled to a rotation motor 38 of an instrument 10 (best seen in FIG. 2) and rotated in either the clockwise or counterclockwise directions. The range of rotation may vary depending on cartridge design and/or application. For example, the rotation of the keyed portion 106 of the rotary valve 108 may be through 360 degrees, 180 degrees or less.

The cartridge 100 also includes a flowcell chamber 110 and a flowcell 112. The flowcell 112 is designed to slide into the flowcell chamber 110 in order to mechanically, electrically and fluidically engage with the cartridge 100.

The cartridge 100 additionally includes a variety of other openings 114 to expose internal components that are electrically, mechanically and fluidically engaged by multiple components of the instrument 10. The instrument 10 utilizes these engaged components to operate the cartridge 100 during a microfluidics analysis operation.

Figure 1B:
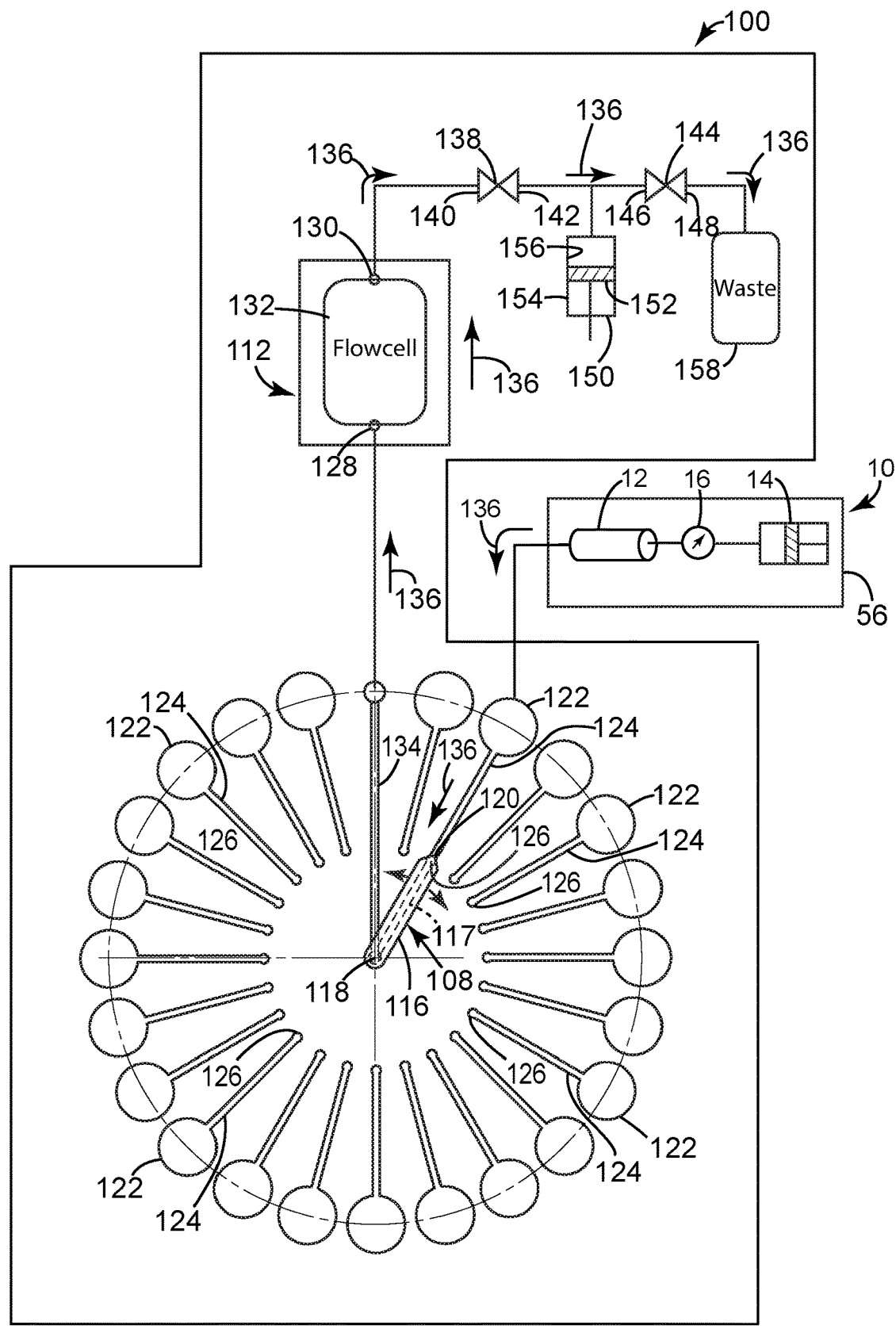
FIG. 1B is a schematic of a fluidic layout of the microfluidic cartridge of FIG. 1A engaged in fluid communication with an instrument for operating the cartridge in accordance with one example described herein.

Referring to FIG. 1B, a schematic of a fluidic layout of the microfluidic cartridge 100 engaged in fluid communication with the instrument 10 for operating the cartridge 100 is presented. The rotary valve 108 has an internal rotary valve body 116 that is affixed to the rotatable outer keyed portion 106. The valve body 116 includes a center port 118 and a rotatable port 120, which are connected by a rotary channel 117. The valve body 116 pivots around the center port 118 when the keyed portion 106 is rotated.

A plurality of wells 122, for containing fluids such as reagents or air, are disposed around the periphery of the rotary valve 108. Each well is in fluid communication with a well channel 124. Each well channel 124 includes a well channel port 126 that the rotatable port 120 of the rotary valve 108 must align with in order to receive fluid from any given well 122.

The cartridge 100 also includes the flowcell 112. The flowcell 112 includes an inlet gasket 128 and an outlet gasket 130 connected by a flowcell channel 132. The flowcell channel 132 may include a sample to be analyzed, such as sample of DNA (not shown). The flowcell 112 can be engaged and disengaged from the flowcell chamber 110 of the cartridge 100.

Once the flowcell 112 is engaged with the cartridge 100, the inlet gasket 128 is engaged in fluid communication with the center port 118 of the rotary valve 108 through a common channel 134. With the rotatable port 120 of the rotary valve 108 aligned with one of the well channel ports 126 and the inlet gasket 128 of the flowcell 112 engaged with the center port 118 of the rotary valve 108, a flow path 136 is established that allows fluid to flow from the selected well 122, through the well channel 124, through the rotary valve 108 and through the flowcell 112. During normal operation, reagents flow from the selected wells 122, through the flow path 136 and into the flowcell 112 to react with the sample disposed in the flowcell.

The cartridge 100 also includes a first ($1^{st}$) pinch valve 138 having a $1^{st}$ inlet 140 and a $1^{st}$ outlet 142. The $1^{st}$ pinch valve 138 is in fluid communication with a second ($2^{nd}$) pinch valve 144 having a $2^{nd}$ inlet 146 and $2^{nd}$ outlet 148. More specifically, the $1^{st}$ outlet 142 of the $1^{st}$ pinch valve 138 is in fluid communication with the $2^{nd}$ inlet 146 of the $2^{nd}$ pinch valve 144. Both pinch valve 138, 144 are opened and closed by the instrument 10.

An onboard pump 150 (such as a syringe pump, or similar) is also disposed on the cartridge 108. Even though the onboard pump 150 may be other types of pumps, it will be referred to herein as the syringe pump 150.

The syringe pump 150 includes a reciprocating plunger 152 disposed in a cylinder 154, which has a cylinder bore 156. The plunger 152 is received within the cylinder bore 156 to form a plunger-cylinder bore seal. The plunger 152 is driven by the instrument 10 to reciprocate within the cylinder bore 156 and to pump fluid through the flow path 136. The syringe pump 150 is in fluid communication with the $1^{st}$ outlet 142 of the $1^{st}$ pinch valve 138 and with the $2^{nd}$ inlet 146 of the $2^{nd}$ pinch valve 144 such that the two pinch valves 138, 144 and the syringe pump 150 are fluidically connected in a tee formation. A waste tank 158 is in fluid communication with the $2^{nd}$ outlet 148 of the $2^{nd}$ pinch valve 144 and is vented to atmosphere. Venting can be through a labyrinth, filter or hydrophobic membrane that adds some fluidic resistance, but generally allows free escape of air to atmosphere while retaining liquid in the waste tank.

Once the flowcell 112 is engaged with the cartridge 100, the outlet gasket 130 is engaged in fluid communication with the $1^{st}$ inlet 140 of the $1^{st}$ pinch valve 138. When both pinch valves 138, 144 are open, the flow path 136 is extended through the pinch valves 138, 144, through the syringe pump 150, through the waste tank 152 and exhausts to the atmosphere.

During operation, the rotatable keyed portion 106 of rotary valve 108 is rotated by a rotation motor 38 in the instrument 10 (best seen in FIG. 2) to align the rotary valve rotatable port 120 with any one of the well channel ports 126 in order to select any one of a plurality of reagents located in the wells 122. The term "align" or "alignment" in the present disclosure encompasses perfect alignment and alignment with relatively small, insignificant amount of deviation/misalignment (e.g., ≤5%). If all the seals within the flow path 136 are engaged and open, the selected reagent (not shown) can flow from the selected well 122 through the well channel 124, through the rotatable port 120 and center port 118 of the rotary valve 108, through the common channel 134, through the flowcell 112, through the $1^{st}$ pinch valve 138, the syringe pump 150, the $2^{nd}$ pinch valve 144 and out the waste tank 152. In this way, samples disposed in the flowcell 112 can be analyzed through reactions with sequentially selected reagents from the wells 122.

However, the functionality of the cartridge 100 and instrument 10 depends on the reliable engagement of the seals between the instrument 10, and cartridge 100. More specifically, the functionality depends on the integrity of the seals between the instrument 20 and the various components within the cartridge 100, such as the rotary valve 108, the flowcell 112, the pinch valves 138, 144 and the syringe pump 150.

However, the flowcell 112 may be repeatedly engaged and disengaged from the cartridge 100, causing wear of seals associated with such flowcell to cartridge engagement. Moreover, the cartridge 100 may be repeatedly engaged and disengaged from the instrument 10, so wear of seals associates with such cartridge to instrument engagement may also occur. Additionally, the rotatable port 120 is repeatedly aligned and unaligned with the various well channel ports 126, so with use misalignment may occur. Further, the pinch valves 138, 144 and reciprocating plunger 152 may also wear due to their high number of operations. For these and other reasons, an in-situ method of testing the seals is utilized to verify the integrity of the various seals.

Basically, this method includes engaging a well 122 of the cartridge 100 with a flow sensor 12 of the instrument 10. A source of pressurized air is connected to the flow sensor 12 in order to establish a mass flow of air through the flow path 136. In this example, the source of pressurized air is a pump 14 (such as a diaphragm or piston pump) with an optional regulator 16. The flow sensor 12, pump 14 and regulator 16 are included as a portion of an in-situ testing assembly 56 within the instrument 10 (best seen in FIG. 2).

Depending on the arrangement of the seals along the flow path 136, the flow path can be made to extend through one of the flow sensor 12, the well channel 124, the rotary valve 108, the flowcell 112, the $1^{st}$ and $2^{nd}$ pinch valve 138, 144 and the syringe pump 150. Then the mass flow of air is measured through the flow path 136 with the flow sensor 12. From the measurements obtained, it can be determined if there is one of an air leak and an air blockage within the flow path 136. As will be explained in more detail herein, the testing method can be done by sequentially stepping through the seals along the flow path 136 in order to verify their integrity one seal at a time.

Figure 2:
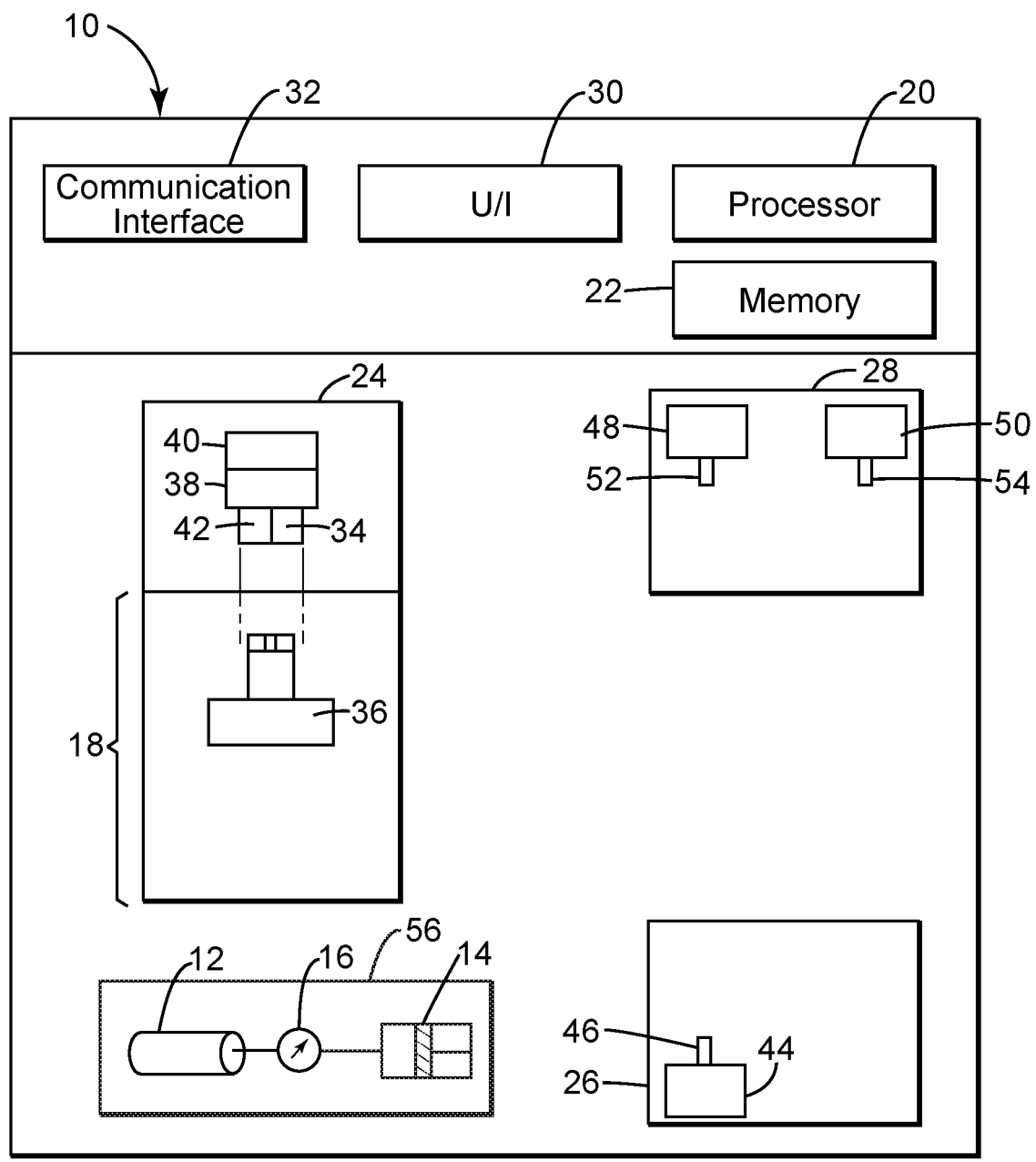
FIG. 2 is a block diagram of an example of the instrument of FIG. 1B in accordance with one example described herein.

Referring to FIG. 2, a block diagram of an example of the fluidic instrument 10 is presented. The instrument 10 includes a docking station 18 to receive the cartridge 100. Various electrical and mechanical assemblies within the instrument 10 interact with the cartridge 100 to operate the cartridge during a microfluidics analysis operation.

The instrument 10 may include, among other things, one or more processors 20 that are to execute program instructions stored in a memory 22 in order to perform the microfluidics analysis operations. The processors are in electronic communication to a rotary valve drive assembly 24, a syringe pump drive assembly 26 and a pinch valve assembly 28.

A user interface 30 is provided for users to control and monitor operation of the instrument 10. A communications interface 32 conveys data and other information between the instrument 10 and remote computers, networks and the like.

The rotary valve drive assembly 24 includes a drive shaft 34, which is mechanically coupled to a rotary valve interface bracket 36. The rotary valve interface bracket 36 is mechanically coupled to the outer keyed portion 106 of the rotary valve 108. The rotary valve drive assembly includes a rotation motor 38 and a translation motor 40. The translation motor 40 moves the drive shaft 34 and interface bracket 36 in a translational direction between and engaged state and a disengaged state with the keyed portion 106 of the rotary valve 108. The rotary motor 38 manages rotation of the keyed portion 106 and rotary valve body 116 of the rotary valve 108.

The rotary valve drive assembly 24 also includes a position encoder 42 that monitors the position of the drive shaft 34. The encoder provides position data to the processor 20.

The syringe pump drive assembly 26 includes a syringe pump motor 44 coupled to an extendable shaft 46. The shaft 46 is driven by the motor 44 between an extended position and a retracted position to reciprocate the plunger 152 within the cylinder bore 156 of the cylinder 154 on the syringe pump 150.

The pinch valve drive assembly 28 includes a pneumatically driven $1^{st}$ pinch valve drive motor 48 and a pneumatically driven $2^{nd}$ pinch valve drive motor 50. The $1^{st}$ pinch valve drive motor 48 includes a $1^{st}$ pinch valve drive motor shaft 52 that is mechanically coupled to the $1^{st}$ pinch valve 138. Drive motor 48 may utilize air pressure to pinch off or release a resilient central portion of the $1^{st}$ pinch valve 138 to pneumatically open and close the valve 138. The $2^{nd}$ pinch valve drive motor 50 includes a $2^{nd}$ pinch valve drive motor shaft 54 that is mechanically coupled to the $2^{nd}$ pinch valve 144. Drive motor 50 may also utilize air pressure to pinch off or release a resilient central portion of the $2^{nd}$ pinch valve 144 to mechanically open and close the valve 144. Alternatively, the drive motors 48, 50 may be electrically driven.

In addition to the components and assemblies involved to perform an analysis of a sample during a normal operation of the cartridge 100, this example of the instrument 10 has the capability of performing an in-situ method of testing the integrity of the various seals in the cartridge 100. In order to provide the instrument with this capability, the in-situ testing assembly 56 is incorporated into the instrument 10.

In this example, the testing assembly 56 includes the flow sensor 12, pump 14 and regulator 16, which are controlled by either commands from the processor 20 or by input from a user through the user interface 30. The flow sensor 12 may be a mass flow sensor, a pressure transducer or the like. The pump 14 may be a diaphragm pump, a piston pump or the like. The regulator 16 may optionally not be included in the testing assembly 56.

The flow sensor 12 of the instrument may be engaged and disengaged to one of the wells 122 of the cartridge 100 once the cartridge is installed in the docking station 18 of the instrument 10 by anyone of several well-known methods. For example, the engagement can be made by use of threaded couplings, quick disconnect couplings, O-Rings or other elastomeric seals or similar.

For purposes herein, engaging or engaged to the well 122 of the cartridge 100 refers to being engaged in fluid communication such that the flow path 136 extends through the flow sensor 12, the well 122 and into the well channel 124. Engaged to the well 122 can include an interface which covers the entire well 122 or just an entryway of the well to the well channel 124.

Alternatively, the in-situ testing assembly 56 may not include an onboard source of pressurized air, such as the pump 14 and regulator 16. Rather the testing assembly 56 may only include the flow sensor 12 and utilize an external source of pressurized air such as shop air, an external pump or a storage tank of pressurized air. An external regulator may be used to reduce the pressure of the external source down to an acceptable range of, for example 2 to 10 pounds per square inch gage (psig).

Figure 3:
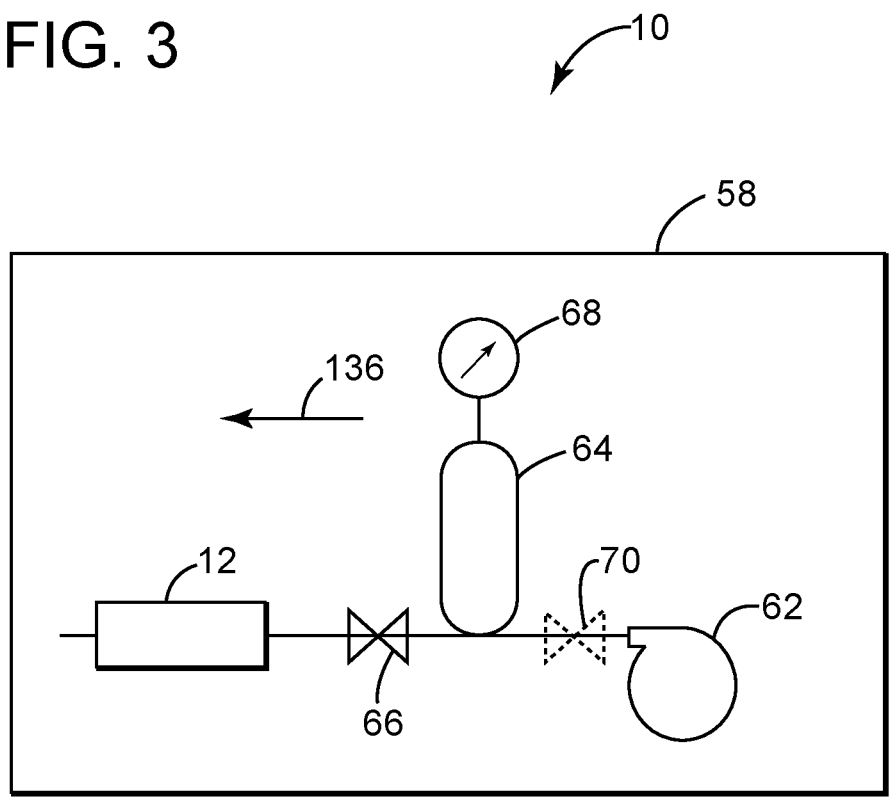
FIG. 3 is a schematic of an alternative example of an in-situ testing assembly of the instrument of FIG. 2 in accordance with one example described herein.

Referring to FIG. 3, a schematic of an alternative example of an in-situ testing assembly 58 of instrument 10 is presented. In this example, a source of pressurized air 62 is connected to the flow sensor 12 in order to establish a mass flow of air through the flow path 136, wherein the flow path 136 may extend through one of the flow sensor 12, and components of the cartridge 100. Those components including one of the well channel 124, the rotary valve 108, the flowcell 112, the $1^{st}$ and $2^{nd}$ pinch valves 138, 144 and the syringe pump 150 (all best seen in FIG. 1B).

In this example, the source of pressurized air 62 is exemplified as an air pump 62 (such as a diaphragm or piston pump) disposed within the in-situ testing assembly 58 of instrument 10. However, the source of pressurized air 62 may be an external air pump, external shop air or the like.

The air pump 62 is connected in series fluid communication with an air reservoir 64 and an inlet of a solenoid valve 66. The outlet of the solenoid valve is connected to the flow sensor 12.

The air reservoir 64 may be a length of resilient tubing that can accumulate an additional mass of air and act as a dampener for pressure pulsations generated from the air pump 62 or it may be a rigid walled reservoir. The air reservoir 64 may be connected to a pressure transducer 68 that electrically communicates with the processor 20 of the instrument 10 or to a pressure gage 68 that may be monitored by a user. Optionally, a cut off valve 70, such as a second solenoid valve or a check valve, may also be inserted between the air pump 62 and air reservoir 64 to prevent back flow of air from the air reservoir 64 to the air pump 62 when the air pump 62 is shut off.

During operation, the solenoid valve 66 is closed and the air pump 62 is operated to raise the pressure of the air reservoir 64 to be equal to or greater than a pressure threshold. For example the pressure threshold could be within a range of 5 to 15 psig. The pressure transducer 68 could indicate to the processor 20 that the threshold has been reached in order to shut off the air pump 62. Alternatively, the pump 62 could be run for a fixed amount of time that is known to raise the pressure above the threshold. Once the threshold is reached, the cut off valve 70 and the closed solenoid valve 66 would maintain the pressure in the air reservoir 64. Alternatively the pump can run during the test cycle, reducing the volume of the reservoir, with the reservoir acting to dampen pulsations from the pump.

Next the solenoid valve 66 can be opened to establish the mass flow of air through the flow path 136 and through the flow sensor 12. The solenoid valve 66 may then be closed when the pressure of the air reservoir 64 is less than the threshold pressure to start the cycle over again. In this example, the duty time on the air pump 62 may be reduced and pressure pulsations may be minimized.

Referring to FIG. 4, an inspection procedure flow chart is presented at 200. Chart 200 illustrates five method steps 0, 1, 2, 3, and 4 that provide an example of a method of in-situ testing of fluidic seals between the instrument 10, cartridge 100 and flowcell 112.

The chart 200 is divided into six rows 210, 220, 230, 240, 250 and 260 and eight columns 211, 212, 213, 214, 215, 216, 217 and 218, wherein:

(a) Row 210 is a column header row which labels each column;

(b) Rows 220, 230, 240, 250, and 260 (collectively 220-260) detail the states of various components and interfaces involved to test selected seals in each step. Additionally, rows 220-260 provide the criteria for passing the test in each step, the purpose of the test and actions to be taken if the test is failed.

The label and purpose of each column is as follows:

(a) Column 211 is labeled "Step." Column 211 sequentially lists the method step numbers and reference numbers associated with those steps.

(b) Column 212 is labeled "Instrument and Flowcell to Cartridge Interface." Column 212 indicates whether the flowcell 112 to cartridge 100 interface and the instrument 10 to cartridge 100 interface are engaged or disengaged for each step.

(c) Column 213 is labeled "Rotary Valve." Column 213 indicates whether the rotary valve 108 is in a blocked location or is aligned with a well channel port 126 for each step.

(d) Column 214 is labeled "$1^{st}$ Pinch Valve." Column 214 indicates whether the $1^{st}$ pinch valve 138 is in a closed state or an open state for each step.

(e) Column 215 is labeled "$2^{nd}$ Pinch Valve." Column 215 indicates whether the $2^{nd}$ pinch valve 144 is in a closed state or open state for each step.

(f) Column 216 is labeled "Results if Test Passed." Column 216 indicates the condition involved for passing each step.

(g) Column 217 is labeled "Purpose of Test." Column 217 indicates the reason for each test for each step.

(h) Column 218 is labeled "Actions on Failed Test." Column 218 indicates corrective actions that may be taken if the test is not passed for each step.

Referring between FIG. 1B and FIG. 4, each test for each sequential step 0-4 will now be described. Reference numbers between 200 and 268 correspond to associated blocks in the flowchart 200 of FIG. 4. Reference numbers between 10 and 158 correspond to associated components in FIG. 1B.

Step 0 (Row 220, Reference 221):

Starting with step 0 (reference 221), the interfaces between the instrument 10 and cartridge 100 and between the flowcell 112 and cartridge 100 are disengaged 222. Additionally, the source of pressurized air 14 is connected to the flow sensor 12 prior to engaging the channel well 122 to the flow sensor 12. Accordingly, the flow path 136 is extended through the flow sensor 12 only and is exhausted to atmosphere.

The purpose of this test 227 is to verify the performance of the flow sensor 12 in an open state. That is, to make sure that the flow sensor 12 is operating. As such, it does not matter, or is not applicable (NA), what the states 223, 224, 225 are of the rotary valve 112, $1^{st}$ pinch valve 138 or $2^{nd}$ pinch valve 144 respectively.

During the test of step 0, the mass flow of the air through the flow path 136 is measured with the flow sensor 12. Engaging the channel well 122 to the flow sensor 12 can be proceeded to only if the measured mass flow of air is equal to or greater than a first ($1^{st}$) open threshold 226 mass flow of air. For example, the $1^{st}$ open threshold mass flow of air may be 300 standard cubic centimeters (sccm), which would mean that the mass flow of air would have to meet or exceed 300 sccm during a specified test time on order to pass the test.

If the mass flow of air falls below the $1^{st}$ open threshold, then a corrective action 228 that may be taken would be to re-initialize the instrument and repeat the test. If the test fails a second time, then the instrument may be flagged as having a hardware failure.

Step 1 (Row 230, Reference 231):

Step 1 (reference 231) can be proceeded to now that the proper operation of the flow sensor 12 has been verified in step 0 (221). In step 1, the interfaces between the instrument 10 and cartridge 100 and between the flowcell 112 and cartridge 100 are engaged 232. More specifically, the channel well 122 of the cartridge 100 is engaged in fluid communication with the flow sensor 12, the $1^{st}$ inlet gasket 128 of the flowcell 112 is engaged in fluid communication with the center port 118 of the rotary valve 108 and the outlet gasket 130 of the flowcell 112 is engaged in fluid communication with the $1^{st}$ inlet 140 of the $1^{st}$ pinch valve 138.

During this step 1, the rotatable port 120 of the rotary valve 108 is rotated by the instrument 10 to a blocked position 233 in the rotary valve. The blocked position 233 may be between channel ports 126 of the rotary valve 108. As such the flow path 136 is extended from the flow sensor 12 to the well channel port 126 where it should be blocked.

The purpose of this test 237 is to confirm that there is no, or little, flow through the rotary valve 108 when in this blocked position. As such, it is important that the states 234 and 235 of both the $1^{st}$ pinch valve 138 and $2^{nd}$ pinch valve 144 are in an open state. Otherwise, the pinch valves 138, 144 could block flow even if there were a leak through the rotary valve 108. Therefore such a leak through the rotary valve 108 would go undetected.

During operation of the test of step 1, the mass flow of air through the flow path 136 is measured with the flow sensor 12. The next step of rotating the rotatable port 120 to align with the channel port 126 can be proceeded to only if the measured mass flow of air is equal to or less than a $1^{st}$ blocked threshold 236 mass flow of air. For example, the $1^{st}$ blocked threshold mass flow of air may be 10 sccm, which would mean that the mass flow of air would have to be equal to or less than 10 sccm during a specified test time on order to pass the test.

If the mass flow of air is above the $1^{st}$ blocked threshold, then a corrective action 238 that may be taken would be to set the rotary valve 108 to a home position, then move the rotary valve 108 to the blocked position and repeat the test.

Step 2 (Row 240, Reference 241):

Step 2 (reference 241) can be proceeded to once no flow through the rotary valve 108 in its blocked position has been confirmed. In step 2, the interfaces between the instrument 10 and cartridge 100 and between the flowcell 112 and cartridge 100 are engaged 242. During this step 2 the rotatable port 120 of the rotary valve 108 is rotated to align 243 with the well channel port 126. Additionally, the $1^{st}$ pinch valve 138 is opened 244 and the $2^{nd}$ pinch valve 144 is opened 245. This arrangement extends the flow path 136 through the rotary valve 108, the flow cell 112, the $1^{st}$ pinch valve 138, the syringe pump 150 and $2^{nd}$ pinch valve 144.

The purpose of this test 247 is to confirm flow once the rotary valve is aligned with the well channel port 126. Once the rotary valve 108 is aligned, the mass flow of air through the flow path 136 is measured with the flow sensor 12. It can then be determined if the measured mass flow of air is equal to or greater than a $2^{nd}$ open threshold 246 mass flow of air. For example, the $2^{nd}$ open threshold mass flow of air may be 200 standard cubic centimeters (sccm), which would mean that the mass flow of air would have to meet or exceed 200 sccm during a specified test time on order to pass the test. If the mass flow of air falls below the $2^{nd}$ open threshold, then a corrective action 248 that may be taken would be to re-align the rotary valve 108 and return to step 1.

In addition to confirming proper flow once the rotatable port 120 of the rotary valve 108 is aligned with the well channel port 126 of the well channel 124, step 2 can also be used for the purpose 247 of determining the fluidic center position 338 (best seen in FIG. 8) of the rotatable port 120 relative to the channel port 126. For purposes of clarity herein, the fluidic center position is the position of alignment of the rotatable port 120 relative to a well channel port 126 that provides the maximum flow through the rotary valve 108. The fluidic center position is also referred to herein as the home position of the rotary valve 108.

To locate the fluidic center position in step 2, the rotatable port 120 of the rotary valve 108 is rotated using the instrument 10 to a plurality of rotatable port positions, wherein the rotatable port positions span across an angular width of the channel port 126. It is important to note that the angular width of the channel port 126 is significantly larger than any angular widths between consecutive rotatable port positions that the rotatable port 120 utilizes to span across the channel port 126. For example, the channel port angular width may be 10 times or greater than any such angular width between rotatable port positions. This is done to provide the resolution to accurately determine the fluidic center position.

During this procedure, the mass flow of air through the flow path is measured at each rotatable port position. The mass flow of air relative to the rotatable port positions is then mapped. From the mapping, the fluidic center position of the rotatable port relative to the channel port is determined.

Additionally from the mapping, the positions of undesired fluid leak paths within the cartridge 100 can also be determined. In order to detect such leakage paths, the rotatable port 120 may be rotated over an angular span that is much larger than the angular width of the well channel ports 126. For example the rotatable port position may span 360 degrees of rotation.

Step 3 (Row 250, Reference 251):

Step 3 (reference 251) can be proceeded to once proper flow through the rotary valve in the aligned position is confirmed. In step 3, the interfaces between the instrument 10 and cartridge 100 and between the flowcell 112 and cartridge 100 are engaged 252. During this step 3 the rotatable port 120 of the rotary valve 108 is rotated to align 253 with the well channel port 126. Additionally, the $1^{st}$ pinch valve 138 is closed 254 and the $2^{nd}$ pinch valve 144 is opened 255. This arrangement blocks the flow path 136 at the $1^{st}$ inlet 140 of the $1^{st}$ inlet valve 138.

The purpose of this test 257 is to detect if the flowcell was inserted. Also it is to detect leakage between the $1^{st}$ pinch valve 138 and the flowcell 112.

During this procedure, the mass flow of air through the flow path 136 is measured with the flow sensor. It can then be determined if the measured mass flow of air is equal to or less than a $2^{nd}$ blocked threshold 256 mass flow of air. For example, the $2^{nd}$ blocked threshold mass flow of air may be 10 sccm, which would mean that the mass flow of air would have to be equal to or less than 10 sccm during a specified test time on order to pass the test.

If the mass flow of air is above the $2^{nd}$ blocked threshold, then a corrective action 258 that may be taken would be to have the instrument 10 automatically re-dock the flowcell 112 in the flowcell chamber 110 of the cartridge 100. Alternatively, the cartridge 100 can be ejected from its docking station 24 on the instrument 10 to be cleaned and reinserted. Thereafter the test can be re-run by returning to step 1. If the re-run is unsuccessful, than the $1^{st}$ pinch valve 138 may be flagged as defective.

Step 4 (Row 260, Reference 261):

Step 4 (reference 261) can be proceeded to once the flowcell seals and $1^{st}$ pinch valve seals are verified. In step 4, the interfaces between the instrument 10 and cartridge 100 and between the flowcell 112 and cartridge 100 are engaged 262. During this step 4 the rotatable port 120 of the rotary valve 108 is rotated to align 263 with the well channel port 126. Additionally, the $1^{st}$ pinch valve 138 is open 264 and the $2^{nd}$ pinch valve 144 is closed 265. This arrangement extends the flow path 136 to the $2^{nd}$ outlet 148 of the $2^{nd}$ pinch valve 144.

The purpose of this test 267 is to detect possible leakage between the pump plunger 152 and the syringe cylinder bore 156. Additionally the purpose is to detect possible leakage through the $2^{nd}$ pinch valve 144.

During this procedure, the mass flow of air through the flow path 136 is measured with the flow sensor. It can then be determined if the measured mass flow of air is equal to or less than a third ($3^{rd}$) blocked threshold 266 mass flow of air. For example, the $3^{rd}$ blocked threshold mass flow of air may be 10 sccm, which would mean that the mass flow of air would have to be equal to or less than 10 sccm during a specified test time on order to pass the test.

If the mass flow of air is above the $3^{rd}$ blocked threshold, then a corrective action 268 that may be taken would be to have the instrument 10 automatically re-exercise the syringe pump 150 and re-test. If the re-test is unsuccessful, than the $2^{nd}$ pinch valve 144 or the syringe pump 150 may be flagged as defective.

FIGS. 5-11 illustrate various examples of graphs of measured test results for steps 0 through 4 in accordance with an example of the present disclosure.

Referring to FIG. 5, a graph 300 of the measured mass flow of air through the flow path 136 during step 0 (row 220, reference 221 of FIG. 4) is presented. The graph 300 shows a fill time 302 to fill the flow path 136 with air. In this example, the fill time is 3 seconds. During the fill time 302, the mass flow will reach a peak flow 304 as the flow path is pressurized and then settle to a test flow 306. The magnitude of the test flow 306 will be measured during a test time 308. In this example, the test time is 5 seconds.

During step 0, if the test flow 306 is equal to or greater than the $1^{st}$ open threshold 310 during the entire test time 308, then the step 0 test is passed and the method can proceed to step 1. In this example, the test flow 306 was measured to be at a steady state level of 443 sccm during the entire test time 308. Since the $1^{st}$ open threshold mass flow of air 310 is set at 300 sccm, the test flow 306 exceeded the threshold 310 and the test is passed.

Figure 6:
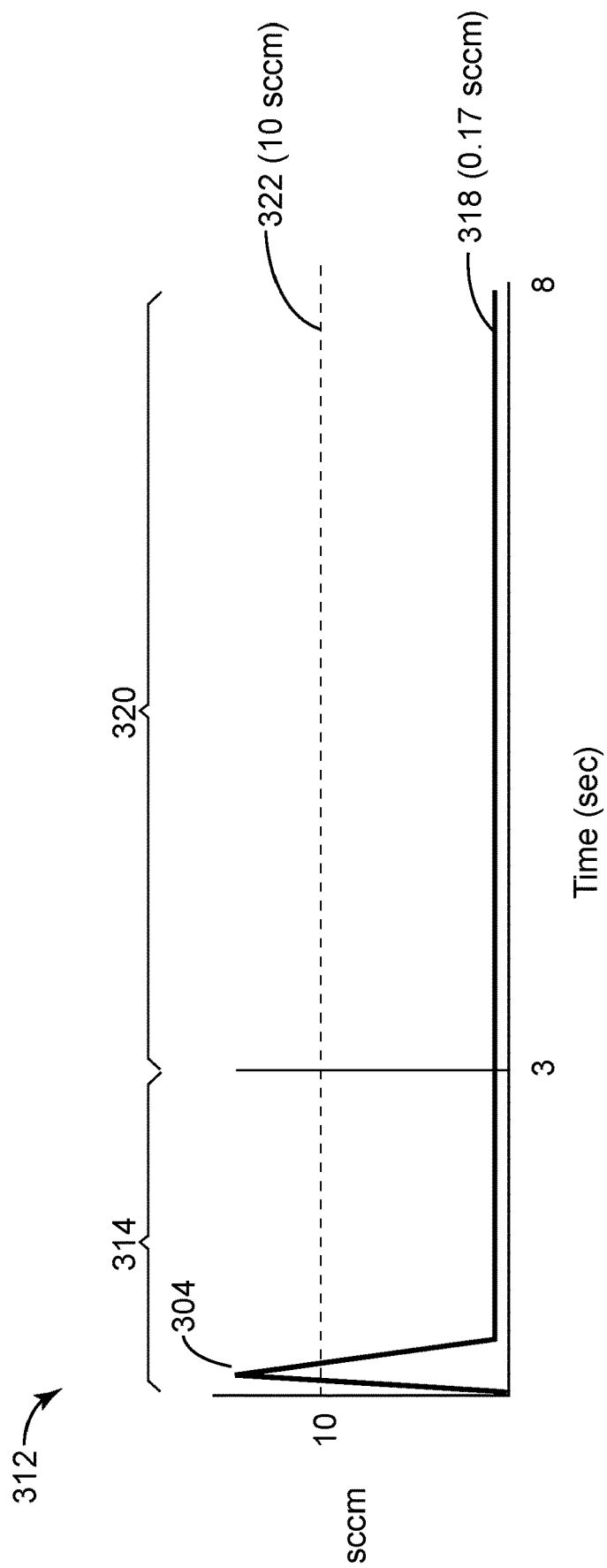
FIG. 6 is a graph of the measured mass flow of air through the flow path during step 1 of the in-situ testing method of FIG. 4 in accordance with one example described herein.

Referring to FIG. 6, a graph 312 of the measured mass flow of air through the flow path 136 during step 1 (row 230, reference 231 of FIG. 4) is presented. The graph 312 shows a fill time 314 to fill the flow path 136 with air. In this example, the fill time is 3 seconds. During the fill time 314, the mass flow will reach a peak flow 316 as the flow path is pressurized and then settle to a test flow 318. The magnitude of the test flow 318 will be measured during a test time 320. In this example, the test time is 5 seconds.

During step 1, if the test flow 318 is equal to or less than the $1^{st}$ blocked threshold 322 during the entire test time 320, then the step 1 test is passed and the method can proceed to step 2. In this example, the test flow 322 was measured to be at a steady state level of 0.17 sccm during the entire test time 320. Since the $1^{st}$ blocked threshold mass flow of air 322 is set at 10 sccm, the test flow 318 is below the threshold 322 and the test is passed.

Figure 7:
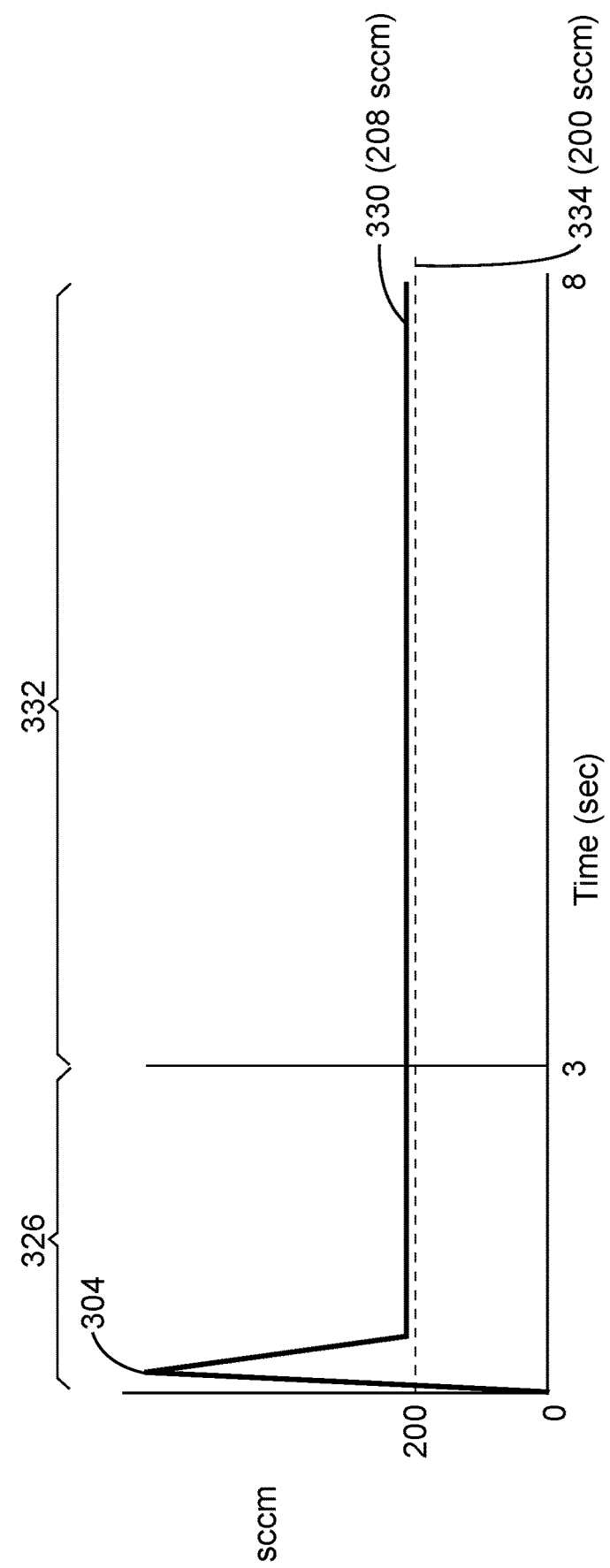
FIG. 7 is a graph of the measured mass flow of air through the flow path during step 2 of the in-situ testing method of FIG. 4 in accordance with one example described herein.

Referring to FIG. 7, a graph 324 of the measured mass flow of air through the flow path 136 during step 2 (row 240, reference 241 of FIG. 4) is presented. The graph 324 shows a fill time 326 to fill the flow path 136 with air. In this example, the fill time is 3 seconds. During the fill time 326, the mass flow will reach a peak flow 328 as the flow path is pressurized and then settle to a test flow 330. The magnitude of the test flow 330 will be measured during a test time 332. In this example, the test time is 5 seconds.

During step 2, if the test flow 330 is equal to or greater than the $2^{nd}$ open threshold 334 during the entire test time 332, then the step 2 test is passed and the method can proceed to step 3. In this example, the test flow 330 was measured to be at a steady state level of 208 sccm during the entire test time 332. Since the $2^{nd}$ open threshold mass flow of air 334 is set at 200 sccm, the test flow 330 exceeded the threshold 334 and the test is passed.

Referring to FIG. 8A, a graph 336 of the fluidic center position 338 of a well channel port 126 relative to an aligned rotatable port 120 of the rotary valve 108 (best seen in FIG. 1B) is presented. In addition to confirming proper flow once the rotatable port 120 of the rotary valve 108 is aligned with the well channel port 126 of the well channel 124, step 2 can also be used for the purpose 247 of determining the fluidic center position 338 (best seen in FIG. 8) of the rotatable port 120 relative to the channel port 126. For purposes of clarity herein, the fluidic center position 338 is the position of alignment of the rotatable port 120 relative to a well channel port 126 that provides the maximum flow through the rotary valve 108. The fluidic center position is also referred to herein as the home position of the rotary valve 108. In this example, the fluidic center position is measured to be located at about 30 degrees.

To locate the fluidic center position in step 2, the rotatable port 120 of the rotary valve 108 is rotated using the instrument 10 to a plurality of rotatable port positions 344 (best seen in FIG. 8B), wherein the rotatable port positions 344 span across an angular width 340 of the channel port 126. In this example, the angular width 340 is measured at about 10 degrees.

Figure 8B:
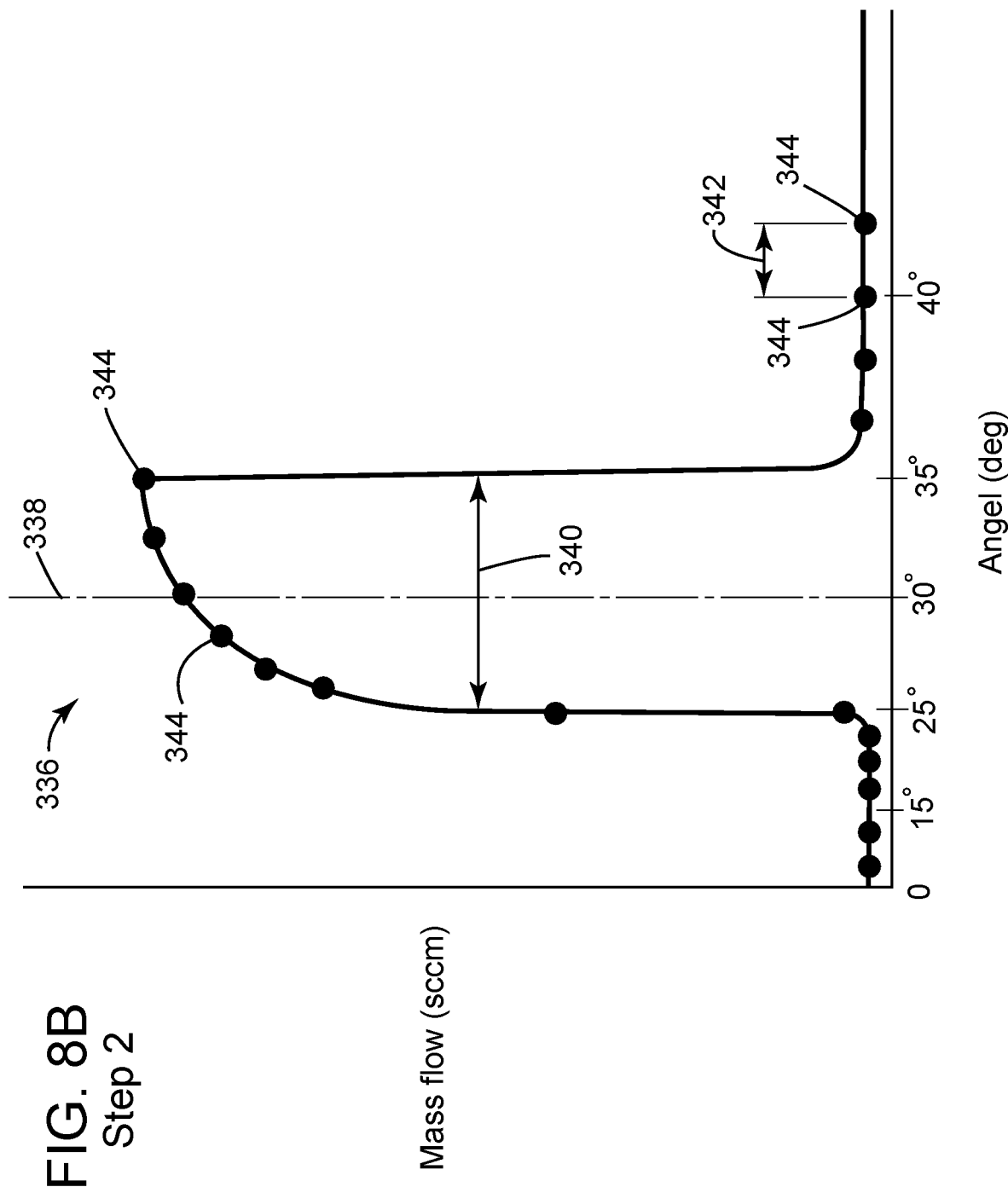
FIG. 8B is an enlarged view of the fluidic center position within the area 8B of FIG. 8A in accordance with one example described herein.

Referring to FIG. 8B, an enlarged view of the fluidic center position 338 within the area 8B of FIG. 8A is presented. It is important to note that the angular width 340 of the channel port 126 is significantly larger than any angular widths 342 between consecutive rotatable port positions 344 that the rotatable port 120 utilizes to span across the channel port 126. For example, the channel port angular width 340 may be 10 times or greater than any such angular width 342 between rotatable port positions 344. This is done to provide the resolution to accurately determine the fluidic center position 338. In this example, the angular width 342 between rotatable port positions 344 is set at 1 degree.

During this procedure, the mass flow of air through the flow path 136 is measured at each rotatable port position 344. The mass flow of air relative to the rotatable port positions 344 is then mapped. From the mapping, the fluidic center position 338 of the rotatable port 120 relative to the channel port 126 is determined.

Figure 9:
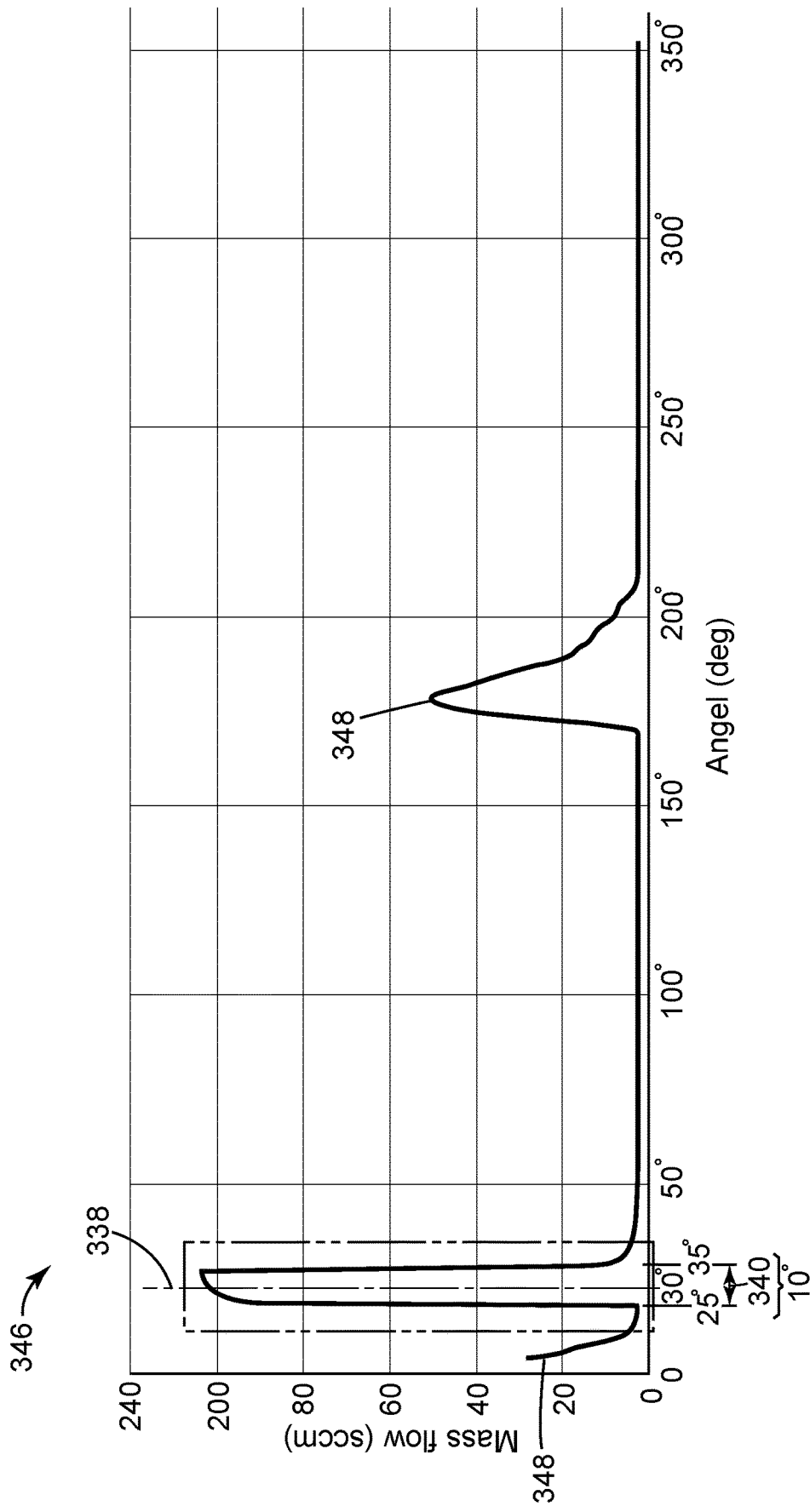
FIG. 9 is a graph of a rotary valve having unwanted leakage paths in accordance with one example described herein.

Referring to FIG. 9, a graph 346 of a rotary valve 108 having unwanted leakage paths 348 is presented. Additionally from the mapping, the positions of undesired fluid leak paths 348 within the cartridge 100 can also be determined. In order to detect such leakage paths 348, the rotatable port 120 may be rotated over an angular span that is much larger than the angular width 340 of the well channel ports 126. For example the rotatable port position may span 360 degrees of rotation.

Figure 10:
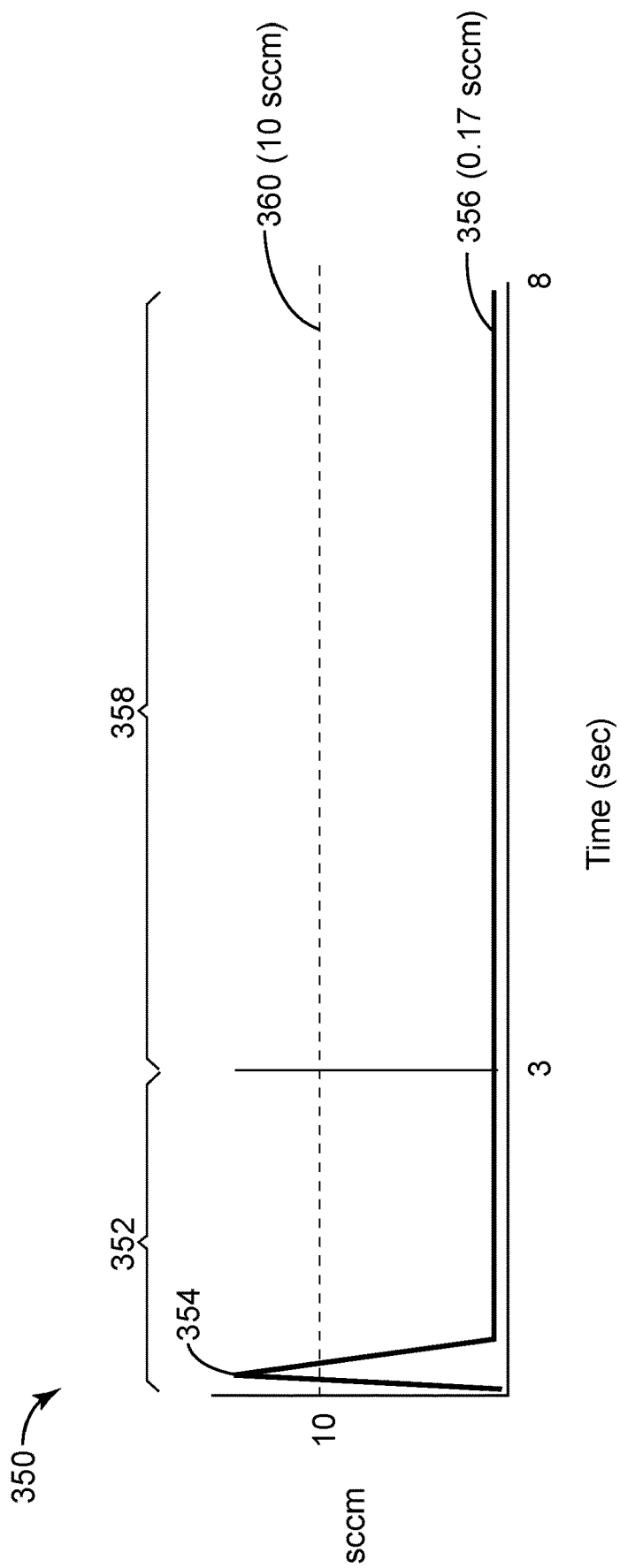
FIG. 10 is a graph of the measured mass flow of air through the flow path during step 3 of the in-situ testing method of FIG. 4 in accordance with one example described herein.

Referring to FIG. 10, a graph 350 of the measured mass flow of air through the flow path 136 during step 3 (row 250, reference 251 of FIG. 4) is presented. The graph 350 shows a fill time 352 to fill the flow path 136 with air. In this example, the fill time is 3 seconds. During the fill time 352, the mass flow will reach a peak flow 354 as the flow path 136 is pressurized and then settle to a test flow 356. The magnitude of the test flow 356 will be measured during a test time 358. In this example, the test time is 5 seconds.

During step 3, if the test flow 356 is equal to or less than the $2^{nd}$ blocked threshold 360 during the entire test time 358, then the step 3 test is passed and the method can proceed to step 4. In this example, the test flow 356 was measured to be at a steady state level of 0.17 sccm during the entire test time 358. Since the $2^{nd}$ blocked threshold mass flow of air 360 is set at 10 sccm, the test flow 356 is below the threshold 360 and the test is passed.

Referring to FIG. 11, a graph 362 of the measured mass flow of air through the flow path 136 during step 4 (row 260, reference 261 in FIG. 4) is presented. The graph 362 shows a fill time 364 to fill the flow path 136 with air. In this example, the fill time is 3 seconds. During the fill time 364, the mass flow will reach a peak flow 366 as the flow path is pressurized and then settle to a test flow 368. The magnitude of the test flow 368 will be measured during a test time 370. In this example, the test time is 5 seconds.

During step 4, if the test flow 368 is equal to or less than the $3^{rd}$ blocked threshold 372 during the entire test time 370, then the step 4 test is passed and the method testing is complete. In this example, the test flow 368 was measured to be at a steady state level of 0.17 sccm during the entire test time 370. Since the $3^{rd}$ blocked threshold mass flow of air 372 is set at 10 sccm, the test flow 368 is below the threshold 372 and the test is passed.

Referring to FIG. 12, an alternative example of a schematic of a fluidic layout of the microfluidic cartridge 100 engaged in fluid communication with the instrument 10 for operating the cartridge 100 is presented. In this example, the source of pressurized air is the syringe pump 150 within the cartridge 100. Therefore, the flow path 136 is reversed relative to the flow path of FIG. 1B. More specifically, the $2^{nd}$ pinch valve 144 is closed and the flow path 136 extends from the syringe pump 150, through the flowcell 112, through the rotary valve 108, to the flow sensor 12. As such, the in-situ testing assembly 56 of the instrument 10 does not involve an on board pump (such as pump 14 of FIG. 1B) or regulator (such as regulator 16 of FIG. 1B).

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the forgoing disclosure has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A method comprising:
    engaging a well of a cartridge with a flow sensor of an instrument, the cartridge comprising:
        a rotary valve comprising a rotatable port and a center port,
        the well in fluid communication with a well channel, the well channel comprising a well channel port that the rotatable port is to align to in order to receive fluid from the well, and
        a flowcell comprising an inlet gasket in fluid communication with the center port;
    connecting a source of pressurized air to the flow sensor in order to establish a mass flow of air through a flow path, the flow path extending through one of the flow sensor, the well channel, the rotary valve, and the flowcell;
    measuring the mass flow of air through the flow path with the flow sensor; and
    determining if there is one of an air leak and an air blockage within the flow path.

2. The method of claim 1, comprising:
    connecting the source of pressurized air to the flow sensor prior to engaging the well to the flow sensor;
    extending the flow path through the flow sensor only;
    measuring the mass flow of air through the flow path with the flow sensor; and
    proceeding to engaging the well to the flow sensor only if the measured mass flow of air is equal to or greater than a first (1st) open threshold mass flow of air.

3. The method of claim 1, comprising:
    rotating the rotatable port to a blocked position in the rotary valve,
    extending the flow path from the flow sensor to the well channel port;
    measuring the mass flow of air through the flow path with the flow sensor; and
    rotating the rotatable port to align with the well channel port only if the measured mass flow of air is equal to or less than a first blocked threshold mass flow of air.

4. The method of claim 3, comprising:
    engaging an outlet gasket of the flowcell with a first inlet of a first pinch valve within the cartridge, the cartridge further comprising:
        the first pinch valve comprising the first inlet and a first outlet,
        a second (2nd) pinch valve comprising a second inlet and a second outlet, and
        a syringe pump in fluid communication with the first outlet and second inlet;
    opening the first and second pinch valves to extend the flow path through the rotary valve, the flow cell, the first pinch valve, the syringe pump and second pinch valve;
    measuring the mass flow of air through the flow path with the flow sensor; and
    determining if the measured mass flow of air is equal to or greater than a second open threshold mass flow of air.

5. The method of claim 4, comprising:
    closing the first pinch valve to block the flow path at the first inlet if the measured mass flow of air is equal to or greater than the second open threshold mass flow of air;
    measuring the mass flow of air through the flow path with the flow sensor; and
    determining if the measured mass flow of air is equal to or less than a second blocked threshold mass flow of air.

6. The method of claim 5, comprising:
    opening the first pinch valve and closing the second pinch valve to extend the flow path to the second outlet if the measured mass flow of air is equal to or less than the second blocked threshold mass flow of air;
    measuring the mass flow of air through the flow path with the flow sensor; and
    determining if the measured mass flow of air is equal to or less than a third (3rd) blocked threshold mass flow of air.

7. The method of claim 1, comprising:
    rotating the rotatable port of the rotary valve using the instrument to a plurality of rotatable port positions, the rotatable port positions spanning across an angular width of the well channel port;
    measuring the mass flow of air through the flow path at each rotatable port position;
    mapping the mass flow of air relative to the rotatable port positions; and
    determining from the mapping a fluidic center position of the rotatable port relative to the well channel port.

8. The method of claim 7, comprising determining positions of a plurality of undesired fluid leak paths within the cartridge from the mapping.

9. The method of claim 1, wherein the flow sensor is one of a mass flow sensor and a pressure transducer.

10. The method of claim 1 comprising:
    connecting the source of pressurized air such that it is in fluid communication with an air reservoir and an inlet of a solenoid valve;
    connecting an outlet of the solenoid valve to the flow sensor;
    raising the pressure of the air reservoir to be equal to or greater than a pressure threshold;
    opening the solenoid valve to establish the mass flow of air through the flow path; and
    closing the solenoid valve when the pressure of the air reservoir is less than the pressure threshold.

* * * * *